(12) United States Patent
Falkowich et al.

(10) Patent No.: US 6,496,625 B1
(45) Date of Patent: Dec. 17, 2002

(54) TRANSMISSION CABLE OPTICAL FIBER PROTECTOR AND METHOD

(75) Inventors: Kenneth Falkowich, Old Saybrook; Christopher Chestnut, Ellington; Christopher Chipman, Scotland; Thomas Engel, East Hampton; Robert Markoja, Cheshire; Phillip E. Pruett, Wallingford; Robert A. Rubino, Tolland; Jeffrey Bonja, Avon; Edward Laffitte, Middletown, all of CT (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 09/497,236

(22) Filed: Feb. 3, 2000

Related U.S. Application Data (63) Continuation-in-part of application No. 09/384,079, filed on Aug. 26, 1999, now abandoned, which is a continuation-in-part of application No. 09/140,916, filed on Aug. 26, 1998, now abandoned.

(51) Int. Cl.$^7$ ................................................. G02B 6/44
(52) U.S. Cl. ........................................................ 385/100
(58) Field of Search .............................. 385/100, 66–68

(56) References Cited

U.S. PATENT DOCUMENTS

| | | | |
|---|---|---|---|
| 4,545,645 A | | 10/1985 | Mignien |
| 4,824,198 A | * | 4/1989 | Anderton |
| 5,241,611 A | | 8/1993 | Gould .......................... 385/70 |
| 5,304,172 A | * | 4/1994 | Manoukian et al. |
| 5,430,821 A | | 7/1995 | Sasoka et al. ................. 385/99 |
| 5,436,999 A | | 7/1995 | Brehm et al. .................. 385/95 |
| 5,533,161 A | | 7/1996 | Atkeisson et al. ............. 385/99 |
| 5,557,697 A | | 9/1996 | Yoshie .......................... 385/99 |
| 5,586,210 A | | 12/1996 | Yoshie et al. |
| 5,592,579 A | | 1/1997 | Cowen et al. ................. 385/99 |
| 5,642,451 A | * | 6/1997 | Kennedy et al. .............. 385/99 |
| 5,894,536 A | * | 4/1999 | Rifkin et al. .................. 385/96 |

FOREIGN PATENT DOCUMENTS

| | | |
|---|---|---|
| DE | 42 10 631 | 7/1993 |
| DE | 42 10 631 A1 | 10/1993 |
| DE | 196 39 184 | 3/1998 |
| DE | 196 39 184 A1 | 3/1998 |
| EP | 0 698 799 A2 | 2/1996 |
| EP | 0 698 799 A3 | 10/1996 |
| FR | 2 677 137 A1 | 4/1992 |
| FR | 91 06454 | 4/1992 |

OTHER PUBLICATIONS

Published application and search report for corresponding PCT application No. PCT/US00/04492 (Publication No. WO 01/98809 A1).
Written opinion for corresponding PCT application No. PCT/US00/04492 (Publication No. WO 01/98809 A1).
Examination report for corresponding PCT application No. PCT/US00/04492 (Publication No. WO 01/98809 A1).

* cited by examiner

*Primary Examiner*—Hung N. Ngo
(74) *Attorney, Agent, or Firm*—Howrey Simon Arnold & White, LLP (57) ABSTRACT

A fiber optic transmission cable fiber protector includes a splice tube positioned over the ends of a pair of fiber optic cables having an outer capillary tube containing at least one optical fiber within an inner capillary tube. The optical fiber protector includes a pair of optical fiber strain relief mechanism positioned near the ends of the optical fibers; the strain relief mechanisms are captured within a heat sink tube that is inserted into each end of the outer capillary tubes. The splice tube is welded to the outer capillary tubes. Heat generated by the welding process dissipated by the heat sink and gases generated during the welding process are vented through a hole in the outer capillary tube into the optical fiber splice area. In an alternate embodiment a weld coupling is welded to each end of the splice tube and is further welded to the outer capillary tubes. A sealing mechanism is positioned on the inner capillary tubes within the outer capillary tubes forming a seal therebetween. A splice protection sleeve is positioned over the optical fiber splice area to protect the splice during assembly of the protector. In an alternative embodiment an optical fiber protector assembly includes a carrier tube disposed onto the inner capillary tube and an optical fiber strain relief mechanism positioned within the carrier tube near the end of the optical fiber capturing the fiber therein in a strain relieved condition.

27 Claims, 6 Drawing Sheets

TRANSMISSION CABLE OPTICAL FIBER PROTECTOR AND METHOD

CROSS REFERENCE TO RELATED APPLICATIONS

This application is a continuation-in-part of commonly owned U.S. patent application, Ser. No., 09/384,079, entitled "Transmission Splice Protector and Method", filed Aug. 26, 1999 now abandoned, which is a continuation-in-part of commonly owned U.S. patent application, Ser. No., 09/140,916, entitled "A Heat Sink for Fiber Optic Cable", filed Aug. 26, 1998 now abandoned.

BACKGROUND OF THE INVENTION

1. Technical Field

The present invention relates to fiber optic cable and, more particularly, to a method and apparatus for protecting the optical fibers of a fiber optic transmission cable.

2. Background Art

Over the years, fiber optic cables have gained popularity and are used in a variety of fields. One such field is oil and gas exploration where fiber optic systems are used for measuring certain conditions underground, such as temperature, pressure, acceleration and vibration. Fiber optic cables extend from surface instrumentation through a wellhead and connect to measurement devices disposed in an underground region to transmit data indicating status of the underground condition to the surface.

A gas and/or oil exploration environment is harsh, characterized by well fluids, extreme temperatures and pressures, and multiple other cables and equipment extending downward through the well into the underground region. The optical fiber is typically fragile and must be shielded from the harsh well environment. To effectively protect the optical fiber from the well environment, the fiber is placed into protective metal tubing and is environmentally sealed therein.

However, a problem arises when sections of the protective tube, or outer capillary tube, must be terminated or connected either during assembly, installation and/or repair. During assembly and installation, segments of the tubing must be joined and sealed to form a continuous protective covering for the long optical fiber. Similarly, when the fiber optic cable must be terminated and repaired or spliced, the metal protective tubing is cut to gain access to the optical fiber, after which the fiber optic cables must be spliced and the cut ends of the protective tubing must be joined or effectively terminated.

After an optical fiber has been cut, the characteristics of the "fiber friendly" termination of the optical fiber as it exits the metal tube is critical, namely for enhanced mechanical reliability offered via the strain relief transition between the rigid metal tube and the fragile fiber. For severe environmental conditions, such as high temperature and vibration applications, the termination must provide isolation of strains exerted on the fiber as a result of differential expansion between the metal tube and fiber, sealing to prevent migration of the fluid and blocking grease from flooding other components and an anti-chaffing feature to protect the fiber where it exits the metal tube. Traditionally, termination of the optical fiber is provided via the bonding or molding of a rubber boot at the fiber exit point from the metal tube. Bonding or molding operations tend to be either too complex or too time consuming for use in the field. Moreover, applications requiring fixturing of the fiber for isolation of modest strains 0.2% (e.g. high temperature installations) necessitate bonding directly to the fiber and which may require stripping of the buffer coating protecting the fiber. This presents the potential for damaging the delicate glass fiber that could precipitate an immediate failure or fail at some point after the system installation, making quality control problematic. What is needed is an optical fiber termination technique which does not require removal of the buffer material and which provides strain relief, and which positively locks and seals the fibers at their terminus from the metal tube.

The joint between the ends of the outer capillary tube must be environmentally sealed to prevent well contaminants from contacting the optical fiber. One known method of environmentally protecting the optical fiber is to use a tray or cabinet to house the fibers. It is not always possible to utilize trays or cabinets to protect the optical fibers because of space constraints. Welding of the metal outer capillary tube is another, and most practical, method for joining the ends of the outer capillary tube during either an assembly, installation and/or repair, because it is the best guarantee for environmental seal. However, the heat and UV light generated by welding can potentially result in damage to the optical fiber disposed inside the outer capillary tube. One method for protecting the optical fiber during a welding operation is disclosed in European Patent Application Number EP0689799A2 that shows the insertion of a metal tube adjacent to the optical fibers. This method would protect the fibers from the UV light but would conceivable conduct a great deal of heat to the optical fibers.

Therefore, there is a need for a method and apparatus for facilitating attachment of the outer capillary tube ends during assembly, installation or repair.

SUMMARY OF THE INVENTION

It is an object of the present invention to provide a method and apparatus to protect optical fibers within a transmission cable and to further facilitate joining ends of a pair of fiber optic transmission cables during assembly, installation or repair.

According to the present invention a heat sink for use during assembly, installation and/or repair of a fiber optic transmission cable includes a heat sink tube disposed within an outer capillary tube of the transmission cable with the optical fiber enclosed within an inner capillary tube and passing through the heat sink tube. The heat sink tube is crimped to the outer capillary tube and is comprised of a material having a high heat conductivity. During the assembly of a splice protector in accordance with the present invention a splice tube is welded to the outer capillary tubes and the heat sink tubes dissipate the heat from the welding process thus protecting the optical fibers from heat damage.

It is another object of the present invention to provide strain relief for optical fibers of a fiber optic transmission cable near the cable termination. In accordance with the present invention a fiber strain relief mechanism for use during assembly, installation and/or repair of a fiber optic transmission cable having an outer capillary tube enclosing at least one optical fiber having a coating material, includes a compliant tube captured within a carrier tube attached to the outer capillary tube. The carrier tube is crimped with the outer capillary tube capturing the coated optical fiber within the compliant tube. In a particular embodiment the compliant tube is comprised of an elastomeric material.

It is further an object of the present invention to provide a splice protection assembly for use in joining the ends of a pair of fiber optic transmission cables where the fiber optic transmission cables include an inner capillary tube enclosing at least one coated optical fiber positioned within an outer capillary tube. In accordance with the present invention the splice protection assembly includes a heat sink tube crimped within the outer capillary tube the end of each cable. An optical strain relief mechanism is crimped within each heat sink to capture the coated optical fiber therein to provide strain relief for a splice that joins the fiber pairs together. A sealing assembly is further included and is positioned on the inner capillary tube within the outer capillary tube and provides a seal therebetween. In a particular embodiment the sealing assembly includes an o-ring positioned between a seal washer and an end plug which cooperate with the heat sink to bias the o-ring against the outer capillary tube. A splice tube is positioned over the fiber splice and is welded to the outer capillary tubes. In alternative embodiments of the present invention a pair of weld couplings is included and is positioned at the ends of the splice tube and both are welded to the splice tube and to the fiber optic transmission cables. The present invention further includes a non-rigid splice sleeve installed over both of the heat sinks covering the optical fiber splice area. The sleeve protects the fiber splice from damage during installation of the splice tube. The heat sink tubes protect the optical fibers during the welding of the splice tube and weld couplings.

It is yet a further object of the present invention to provide a method of protecting a splice between the ends of a pair of fiber optic transmission cables where the fiber optic transmission cables includes an inner capillary tube enclosing at least one coated optical fiber positioned within an outer capillary tube. In accordance with the present invention the method includes the crimping of a heat sink tube within the outer capillary tubes while feeding the optical fiber through the heat sink tube and through a fiber strain relief tube. Crimping the fiber strain relief tube within the heat sink tube captures the optical fibers. The method further includes the installation of a splice tube by sliding the splice tube over one of the fiber optic transmission cables. A fiber optic splice is performed and the splice tube is positioned over the optic fiber splice. Welding the splice tube to the fiber optic transmission cables protects the splice area. Sealing of the splice area is accomplished in accordance with present invention by installing a sealing mechanism on the inner capillary tube within the outer capillary tube. In particular embodiments of the present invention the venting gases heated during welding step is accomplished by venting them through a vent hole positioned in the outer capillary tube, however, internal to the splice tube.

One advantage of the present invention is that it simplifies the installation and repair procedures in the field and assembly process during manufacturing. Another advantage of the present invention is that it provides strain relief to the coated fibers within the fiber splice area. Yet another advantage of the present invention is that it provides seal protection to the splice area.

The foregoing and other advantages of the present invention become more apparent in light of the following detailed description of the exemplary embodiments thereof, as illustrated in the accompanying drawings.

DETAILED DESCRIPTION OF THE INVENTION

Figure 1:
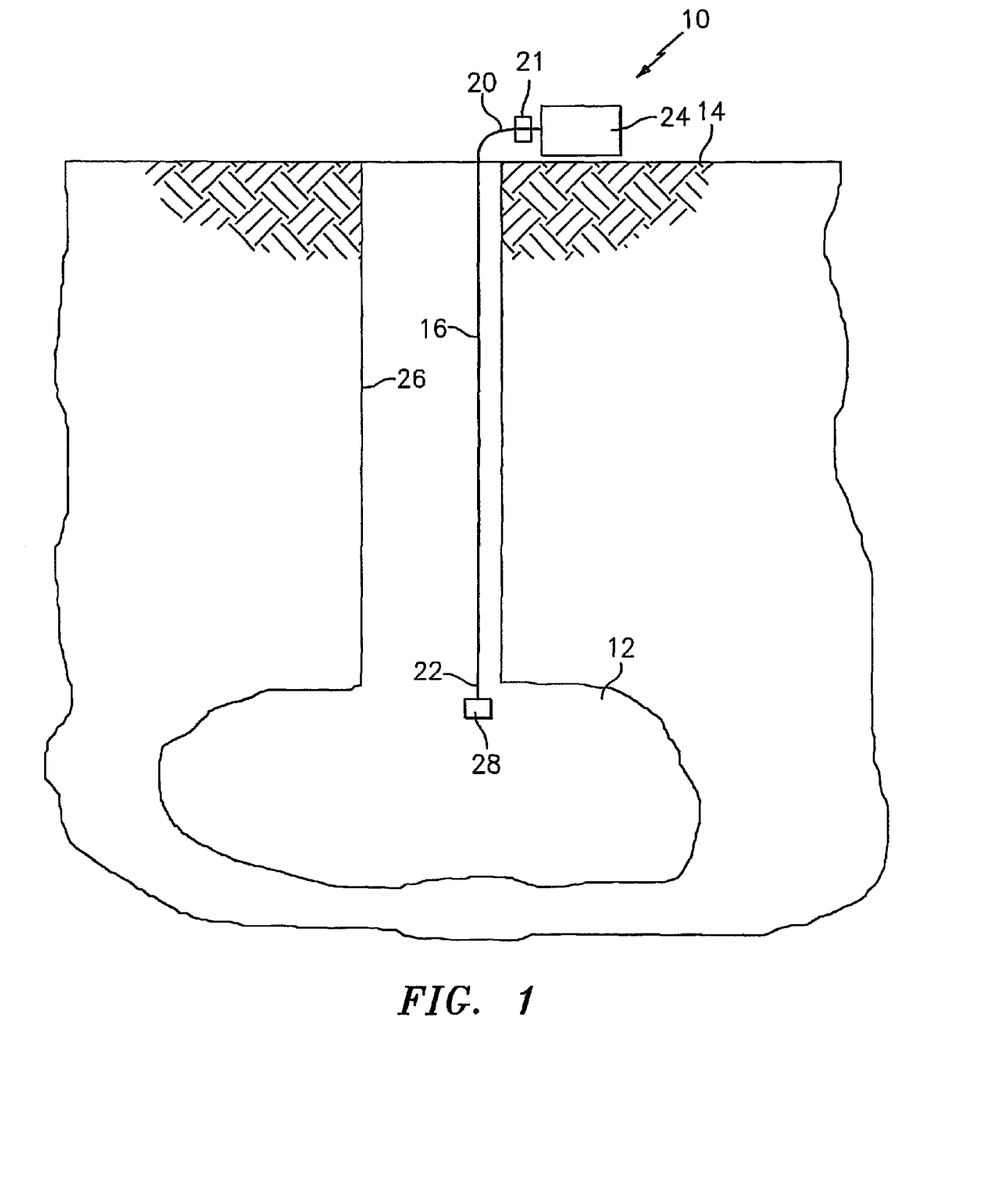
FIG. 1 is a schematic representation of a fiber optic cable extending through a well into an underground region.

Referring to FIG. 1, a system 10 for detecting various conditions in an underground region 12 and transmitting data indicating status of those conditions to the surface 14 includes a fiber optic cable 16 having a surface end 20 and an underground end 22. The surface end 20 typically exits the well through well-head 21 and of the fiber optic cable 16 attaches to an instrumentation box 24 disposed on the surface 14 while the underground end 22 extends into the underground region 12, passing through a well 26 and supporting one or more measuring devices 28. One or more splices of the optical fibers, as are known, may be performed at the cable termination point within wellhead 21 and instrument box 24.

Figure 2:
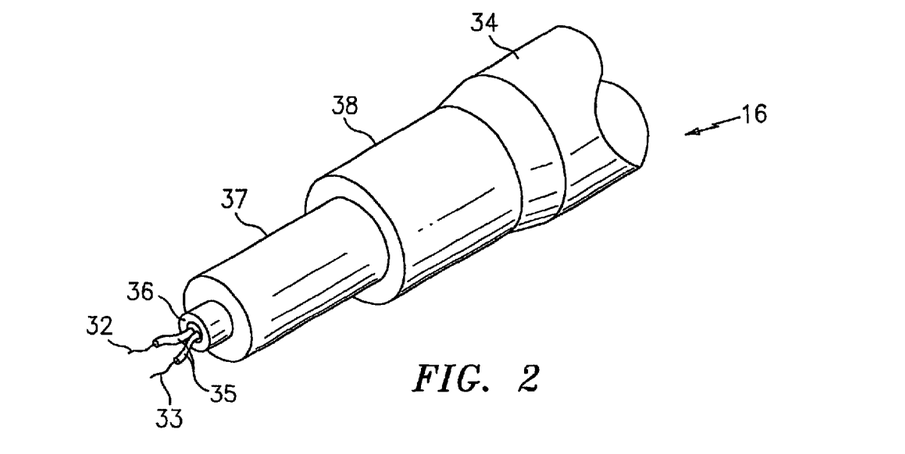
FIG. 2 is a cross sectional perspective representation of the fiber optic cable of FIG. 1.

Referring to FIG. 2, the fiber optic cable 16 includes a pair of optical fibers 32, 33 ultimately shielded by a protective tube, outer capillary tube 34. Typically, the optical fibers 32, 33 are encased in a thin layer of flexible coating 34. An example of the optical fiber cable is described in commonly owned copending U.S. patent application Ser. No. 09/121,468, entitled "Optical Fiber Cable For Use In Harsh Environment", filed Jul. 23, 1998, which is incorporated herein by reference. A single optical fiber may be used or multiple optical fibers may be used without departing from the scope of the present invention. Optical fibers 32, 33 may be affixed to the inner capillary tube 37 using a pliable material 36, grease for example. A blocking polymer 38 is disposed between inner capillary tube 37 and outer capillary tube 34. The arrangement of FIG. 2 ensures that the optical fibers 32, 33 are protected from the environment and are further protected from any mechanical loads imparted on the fiber optic cable 16. Although shown as a single layer, blocking polymer 38 may be comprised of multiple layers without departing from the scope of the present invention.

A splice protector assembly 40 is best shown with reference to FIG. 3 wherein two fiber optical fibers 32, 33 of transmission cable segments 42, 44, similar to that described herein above, are permanently joined together by any known technique. Splice assembly 40 mechanically joins transmission cable segments 42, 44 via splice couplings 46, 48 and outer tube 50. Splice couplings 46, 48 are welded to fiber optic cables 42, 44 at circumferentially positioned cable interface welds 52, 54 respectively and are in turn welded to outer tube 50 at circumferential butt welds 56, 58, respectively. The metallic splice couplings 46, 48 and outer tube 50 together with welds 52, 54, 56, 58 provide an adequate load path between transmission cable segments 42, 44 and further form a permanent seal to protect the optical fibers 32, 33 from the environment. Although shown as welds, the couplings and outer tubes may be joined in any known manner that sufficiently provides the optical fibers with adequate physical and environmental protection. Further, alternative embodiments of the present invention include a splice tube wherein one or more of the weld couplings are integrally formed thereon. Still further, the present invention includes embodiments wherein splice tube 50 is welded directly to transmission cable segments 42, 44.

Figure 3:
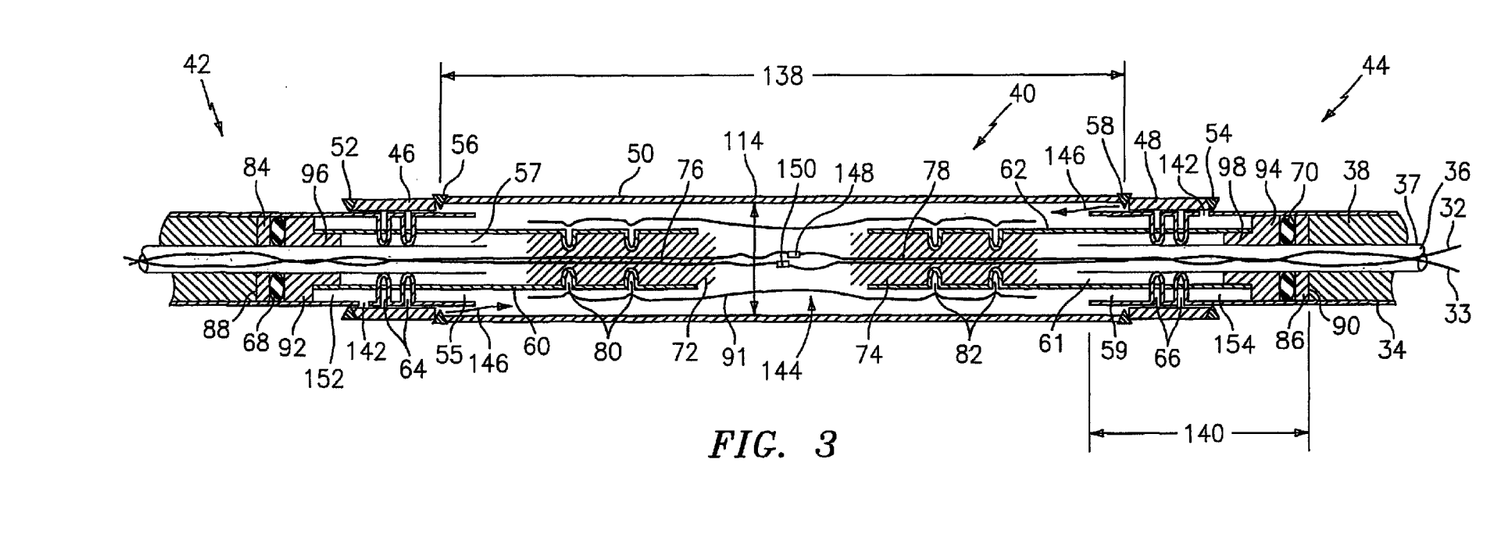
FIG. 3 is a cross sectional schematic representation of a splice protection assembly for use during assembly, installation and/or repair of the fiber optic cable of FIG. 2, according to one embodiment of the present invention.

Still referring to FIG. 3, splice assembly 40 of the present invention includes heat sink tubes 60, 62 disposed within the ends of fiber optic cables 42, 44. Heat sink tubes 60, 62 are attached to fiber optic cables 42, 44 by, for example, a pair of swaged crimps 64, 66 respectively. Other methods of attachment are possible. Heat sink tubes 60, 62 protect optical fibers 32, 33 which pass therethrough from the deleterious effects of the welding operations to form welds 52, 54, 56, 58, such as heat and infrared radiation. The heat sink tubes are made from a metal having a high heat transfer coefficient such as copper, silver, or aluminum, for example, and, together with air gaps 55, 57, 59, 61, insulate and transfer the heat away from capillary tubes 37 and optical fibers 32, 33 as will be more fully explained herein after. As described herein above, splice protection assembly 40 protects optical fibers 32, 33 from environmental exposure. In accordance with the present invention o-rings 68, 70 cooperate with the welds 52, 54, 56, 58 to seal the fibers from the environment. O-rings 68, 70 are compressed between outer capillary tubes 34 and inner capillary tubes 37 providing a seal therebetween. The seal is provided to prevent any fluids (not shown) from flooding the area of the fiber splice in the event that the integrity of outer capillary tube 34 is breached in either segment 42, 44 outside of the area of the splice 40.

Splice assembly 40 further comprises a compliant tube 72, 74 disposed within each of the heat sink tubes 60, 62 and having an aperture 76, 78 with optical fibers 32, 33 passing therethrough. In this regard, heat sink tubes 60, 62 function as carrier tubes to support the compliant tube tubes 72, 74. Compliant tubes 72, 74 are shown captured inside heat sink tubes 60, 62, by a pair of swaged crimps 80, 82 as will be discussed more fully herein below, however other methods of attachment are possible. In a particular embodiment, the compliant tubes 72, 74 are comprised of an elastomeric material that holds the optical fibers 32, 33 therein against differences in thermal expansion between the optical fibers and the cable 42, 44, and blocks inner buffer material (or other) material from exiting the cable. As discussed herein above, the heat sink tubes 60, 62 are crimped to the outer capillary tubes 34 at crimps 64, 66 and as a result any potential tension in the optical fibers 32, 33 is transferred into the first pair of crimps 80, 82 and into the heat sink tubes 60, 62 and then transferred into the outer capillary tubes 34 through the second pair of crimps 64, 66. This arrangement significantly reduces the stress induced into the fibers 32, 33 during manipulation and use of the transmission cable sections 42, 44. The crimps 64, 66 also restrict motion of optical fibers 32, 33 in the splice area 144 (FIG. 3) relative to the outer capillary tubes 34 of the respective cable segments 42, 44 during manipulation and use. In the embodiment described elastomeric tube 72, 74 preferably comprises a low durometer and high coefficient of friction, which permits the fiber to be captured up to strains of 0.2% by mechanically crimping the soft elastomer into the fiber coating or buffer 35. The fiber buffer 35 remains intact and does not adversely affect the optical characteristics of the fibers 32, 33. The mechanical crimping process, as discussed in detail herein below, is less complicated than that of the prior art. In addition, the low durometer of the elastomeric material of the compliant tubes 72, 74, conformably "flows" around the fibers collapsing apertures 76, 78 against fibers 32, 33 thereby sealing the optical fibers within the heat sink tubes 60, 62.

Figure 3A:
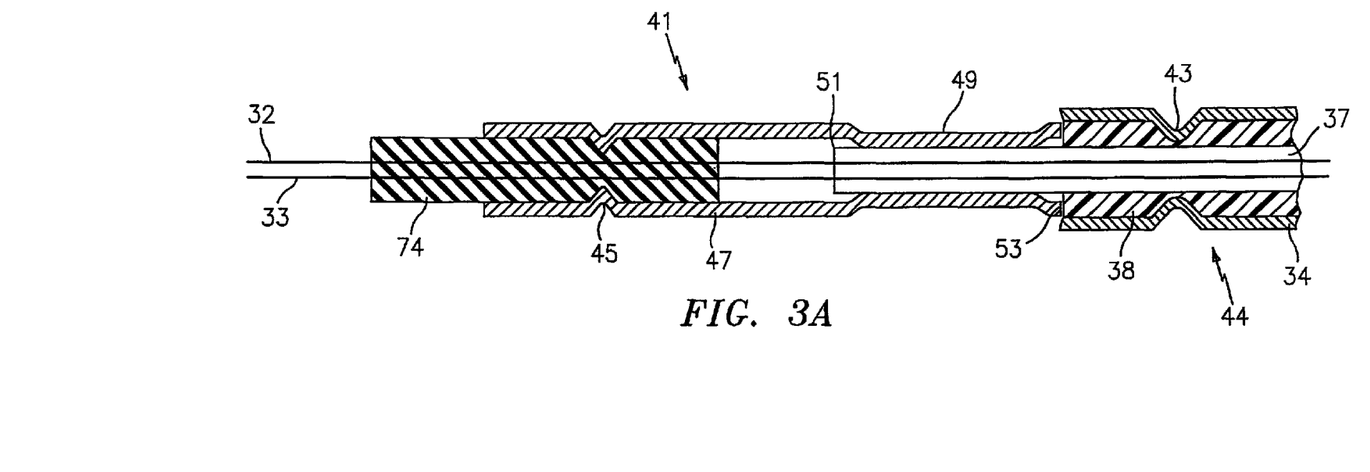
FIG. 3A is a cross sectional schematic representation of a fiber optic cable termination for use during assembly, installation and/or repair of the fiber optic cable of FIG. 2, according to one embodiment of the present invention.

Referring now to FIG. 3A there is shown an embodiment of a termination 41 of the present invention. As described hereinbefore termination 41 may be used in areas such as a wellhead 21, instrumentation box 24, transportation, handling or other non-harsh environment or use. In essence, termination 41 is suitable where a fiber optic transmission cable 44 is terminated without need to weld the splice protector assembly 40 (FIG. 3). Single end termination 41 includes a circumferential crimp 43 within outer capillary tube 34 to capture inner capillary tube 37 therein. Crimp 43 provides a level of flood protection, both from a breach in the cable 44 or into the cable from an external source (not shown) as described hereinabove. Strain relief is provided in single end termination 41 by capturing optical fibers 32, 33 within compliant tube 74. Unlike the splice protector assembly 40 (FIG. 3), compliant tube 74 is ultimately fixed directly to the inner capillary tube 37 instead of outer capillary tube 34. In this particular embodiment compliant tube 74 is coupled to fiber optic transmission cable 44 via crimp 45 in carrier tube 47 that is in turn fixed directly to inner capillary tube 37 by hex crimp 49. Carrier tube 47 is preferably comprised of a ductile metal such as copper, but may comprise any material capable of coupling with inner capillary tube 37 and capturing compliant tube 74 therein to provide strain relief to fibers 32, 33. The fiber optic cable termination 41 allows for a more straight forward attachment of the strain relief features than that of splice protector 40 (FIG. 3) by virtue of the fact that no subsequent weld procedures are required which would necessitate a heat sink 62 (FIG. 3) to direct the heat of the weld away from the fibers 32, 33 as described hereinabove. Fiber optic cable termination 41 is further simplified in that no removal of transmission cable buffer 38 is required and that a shorter overall length is required to terminate the cable. Although shown and described as crimps 43, 45, 49, the present invention encompasses any known method of attachment of the various features.

Splice assembly 40 further comprises seal washer 84, 86 disposed on capillary tubes 37 within outer capillary tubes 34 positioned between o-ring 68, 70 and end portion 88, 90 of the polymeric blocking material 38. In addition, end caps 92, 94 having shoulder portions 96, 98 are installed within outer capillary tubes 34 and within heat sink tubes 60, 62 with the shoulder portions captured between the heat sink tubes and capillary tubes 37. End caps 92, 94 work to position and center heat sink tubes 60, 62 about inner capillary tube 37 during the crimping operations for swaged crimps 64, 66 and further cooperate with sealing washer 86 to provide a compressive force on o-rings 68, 70 ensuring the sealing action of the o-rings as described herein above. Although shown as separate elements, end caps 92, 94 may be integrally formed with heat sink tubes 60, 62.

Still referring to FIG. 3, the present invention further includes a splice protection sleeve 91 disposed between heat sink tubes 60, 62 in splice area 144. Splice protection sleeve 91 provides a protective bridge over fiber splices 148, 150 between the ends of elastomeric tubes 72, 74 to facilitate installation of splice tube 50 over the splice area 144. In operation, and as will be more fully described herein below, splice tube 50 is slid over the splice area 144 prior to performing welds 52, 54, 56, 58. It has been observed that during the positioning of splice tube 50 fiber splices may be damaged. Splice sleeve 50 is typically comprised of a non-rigid tubing to prohibit splice tube 50 from contacting the fiber splices 148, 150 and which permits the structural loads to bypass the fiber splices as described herein above. In a particular embodiment, protective splice sleeve 91 is comprised of a heat shrinkable Teflon® tube that is installed over heat sink tubes 60, 62 and shrunk thereon by an external heat source (not shown) to form the aforementioned bridge. As shown, protective splice sleeve 91 is shrunk into crimps 80, 82 to more securely position the sleeve between the heat sink tubes 60, 62.

Figure 4:
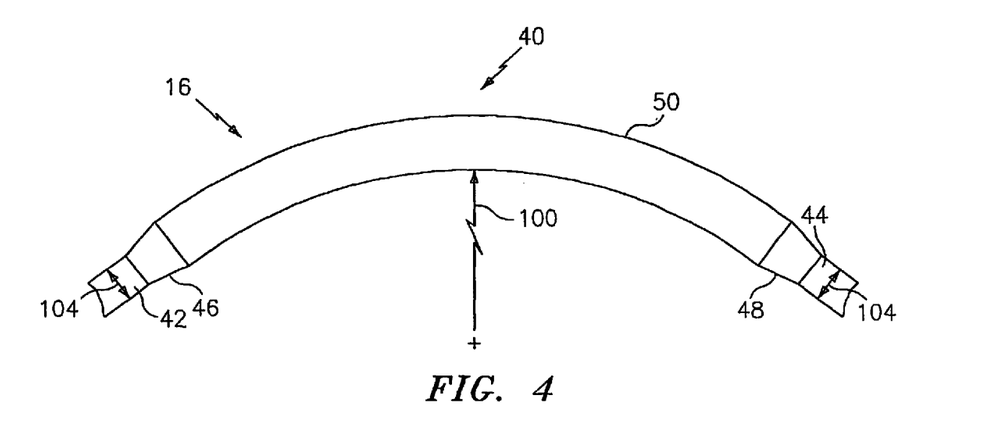
FIG. 4 is a plan view of the splice assembly of FIG. 3 joining together two sections of the fiber optic cable of FIG. 2.

Referring to FIG. 4 splice assembly 40 is shown joining fiber optic cable sections 42, 44 to form a continuous fiber optic cable 16 bent about a radius depicted by arrow 100. It is common within the art for cable to be bent for transportation, storage, and installation and for other various reasons. The present invention permits such repeated deformation of transmission cable 16 without damage to the optical fibers 32, 33 (FIG. 2) due to the robust physical and environmental protection offered by splice assembly 40 as described herein above. In addition, the end caps 92, 94 cooperate with the outer capillary tubes 34, heat sink tubes 60, 62 and elastomeric tubes 72, 74 of the present invention to maintain optical fibers 32, 33 near the neutral axis of the transmission cable which further reduces the stress transmitted to the fibers during bending of the cable.

Figure 5:
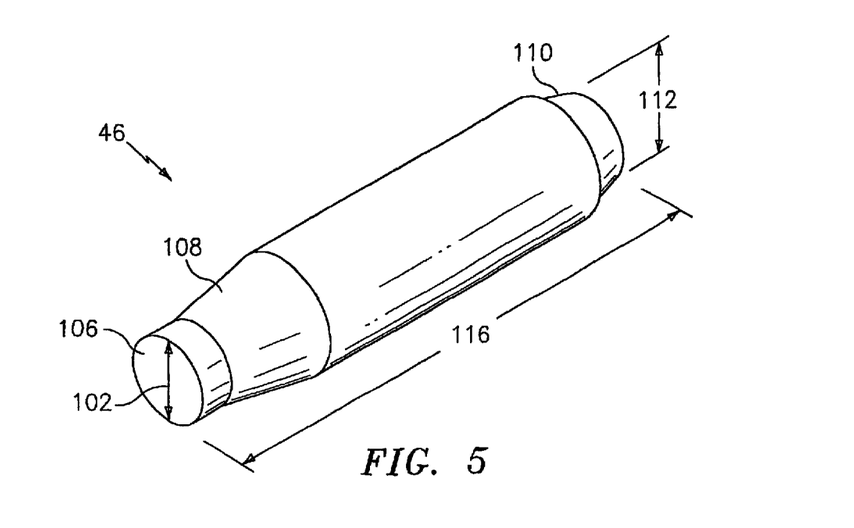
FIG. 5 is a perspective view of a weld coupling of the splice assembly of FIG. 3 according to one embodiment of the present invention.

Referring to FIG. 5 there is shown a weld coupling 46 (and similarly weld coupling 48) of the present invention having an inside diameter 102 sized to fit closely about the outside diameter 104 (FIG. 4) of outer capillary tube 34 of transmission cable section 42. The close tolerance of the weld coupling 46 to the outer capillary tube 34 provides a small gap between the elements for seam weld 52 (FIG. 3) at front end 106 to ensure an impervious weld and environmental protection of the optical fibers thereby. The close tolerance further provides an efficient structural load share between the outer capillary tube 34 of fiber optic cable 42 and the splice outer tube 50. In certain embodiments, weld coupling 46 includes a frustoconical section 108 to further facilitate the transition of loads from outer capillary tube 34 into splice tube 50 and to eliminate a sharp step in the transmission cable 16 after it has been spliced to enhance the handling characteristics of the cable. Weld coupling 34 further includes a shoulder section 110 having an outside diameter 112 sized to mate with an inside diameter 114 (FIG. 3) of splice tube 50. Shoulder section 110 provides circumferential alignment between weld coupling 46 and splice tube 50 to ensure that weld 56 is impermeable to provide environmental protection of the optical fibers. In a particular embodiment of the present invention, inner diameter 102 of weld coupling 46 is about 0.256 inches and the outside diameter 104 of outer capillary tube 34 is about 0.25 inches providing a nominal clearance of about 0.005 inches. With this minimal clearance the length 116 of weld coupling 46 is selected to allow the coupling to be slid over slight bends in the fiber optic cable 16 during the assembly operation as will be more fully described herein below. Outer splice tube 50 has an inside diameter 114 (FIG. 3) of about 0.277 inches and slidably fits over shoulder 110 of weld coupling 46 and further has a nominal outside diameter of 0.375 inches. Other embodiments of weld coupling 46 do not comprise a shoulder 110 which necessitates circumferential alignment between weld coupling 46 and splice tube 50 to ensure that weld 56 is impermeable to provide environmental protection of the optical fibers. The weld couplings 46, 48 and splice tube are comprised of compatible metallic material such as Inconel 825, Inconel 625 and various stainless steels.

Figure 6:
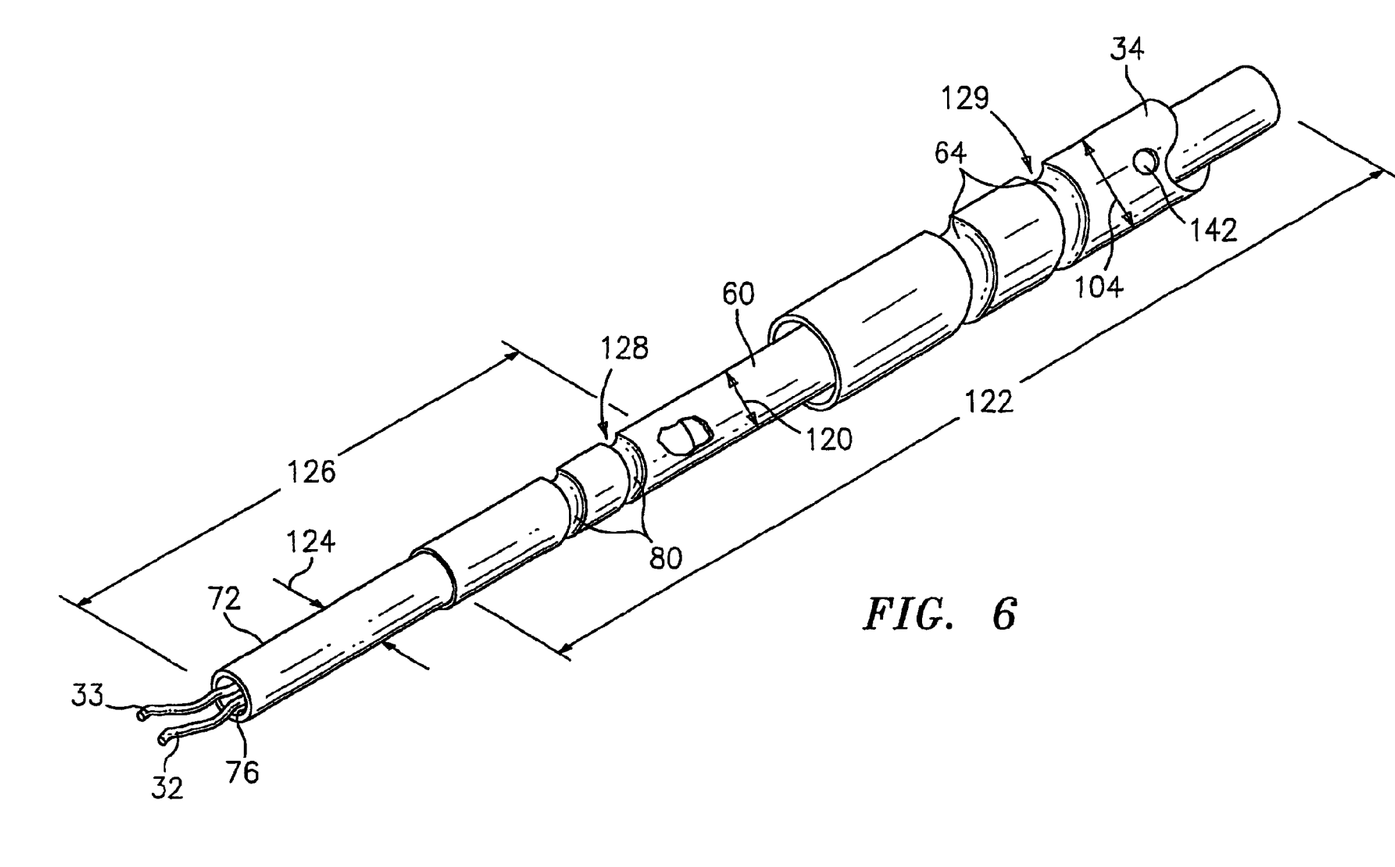
FIG. 6 is a perspective view in partial section showing a heat sink and elastomeric crimp section of the splice assembly in accordance with the present invention.
Figure 7:
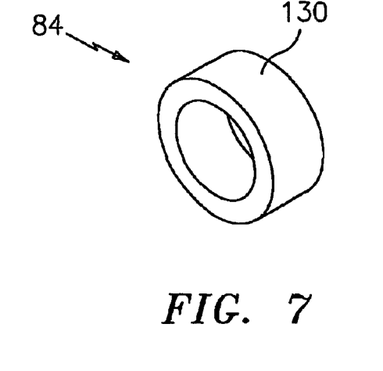
FIG. 7 is a perspective view of a sealing end washer of the splice assembly of the present invention.
Figure 8:
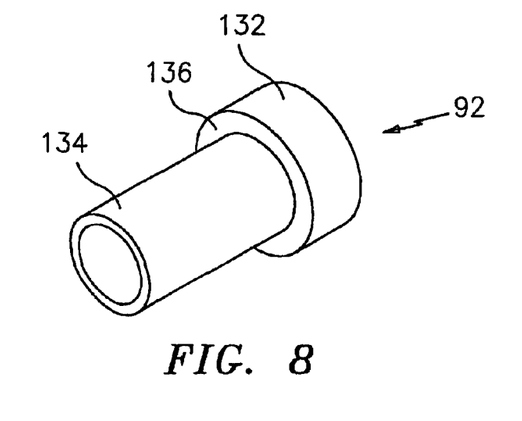
FIG. 8 is a perspective view of an end cap of the splice assembly in accordance with the present invention.
Figure 9:
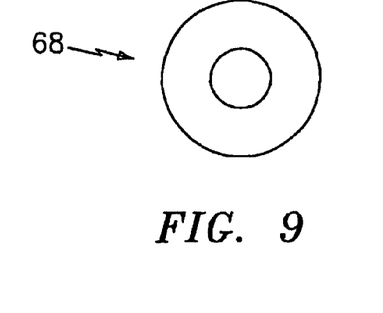
FIG. 9 is a plan view of an o-ring for use in sealing the splice assembly of the present invention.

Referring to FIG. 6 there is shown heat sink tube 60 (and similarly 62 of FIG. 3) for dissipating the heat generated by welds 52, 56. In a specific embodiment of the present invention heat sink tube 60 is comprised of a copper alloy material having a nominal outside diameter 120 of 0.156 inches and a nominal wall thickness of 0.014 inches and has a length 122 of about 6.0 inches. Heat sink tube 60 includes the swaged crimp pair 80 capturing and centering compliant tube 72 and optical fibers 32, 33 therein. Compliant elastomeric tube 72 has a nominal outside diameter 124 of 0.125 inches a length 126 of 1.0 inches and an aperture 76 diameter of 0.065 inches. In the embodiment shown, crimps 80 have a depth 128 of about 0.100 inches and are spaced about 0.25 inches apart to capture compliant elastomeric tube 72 and to collapse aperture 76 onto optical fibers 32, 33 thereby providing a sealing medium around the fibers and provides strain relief to the optical fibers as described herein above. Although a pair of crimps is shown it should be understood that a single crimp, or other suitable attachment, is contemplated by the present invention.

The sealing and outer crimping features of the present invention are best described with reference to FIGS. 3, 7, 8 and 9. Seal washer 84 (and similarly 86) is disposed on inner capillary tube 37 and abuts with end portion 88 of polymeric blocking material 38. Outside surface 130 interfaces with the inside diameter of outer capillary tube 34 and in a likewise fashion, end cap 92 (and similarly 94) is disposed on inner capillary tube 37 wherein outside surface 132 interfaces with outer capillary tube 34. End cap 92, 94 may be slidably arranged within heat sink tubes 60, 62 or may be brazed, soldered or otherwise permanently attached or integrally formed with the heat sink tubes. In a particular embodiment, both seal washer 84 and end cap 92 are comprised of a copper material and have a nominal outside diameter of about 0.187 inches and an inside diameter of 0.100 inches. Other materials attachment methods are possible for both seal washer 84 and end cap 92. Heat sink tube 60 (and similarly 62) is slidably positioned over shoulder 134 of end cap 92 and abuts face 136 to radially center the heat sink tube and coincidentally optical fibers 32, 33, within outer capillary tube 34. O-ring 68 is disposed in an interference fit between inner capillary tube 37 and outer capillary tube 34. In a particular embodiment o-ring 68 is comprised of a compliant material such as Viton® to effectively seal off the area between blocking material 38 or outer capillary tube 34 and inner capillary tube 37. The o-ring 68 is further positioned between sealing washer 84 and end cap 92 and is held in lateral compression therebetween as heat sink tube 60 biases end cap 92 against the o-ring as will be more fully discussed herein below.

Referring to FIG. 6 there is shown outer capillary tube 34 which comprises the outer covering of the fiber optic cable as described in the above referenced copending patent application. In a specific embodiment of the present invention outer capillary tube 34 has a nominal outside diameter 104 of 0.25 inches and a nominal wall thickness of 0.028 inches and is typically produced in continuous lengths up to 10,000 feet or more for use in system 10 (FIG. 1). Outer capillary tube 34 includes the swaged crimp pair 64 fixedly capturing heat sink tube 60 therein and providing a structural support for the heat sink tube and terminus of optical fibers 32, 33. Heat sink tubes 60, 62 may alternatively be captured within outer capillary tubes 34 by a single crimp or other suitable method of attachment. In the embodiment shown, crimps 64 have a depth 129 of about 0.150 inches and are spaced about 0.25 inches apart to capture heat sink tube 60. The outer capillary tube 38 captures and centers the heat sink tube 60 and elastomeric tube 72 thereby centering fibers 32, 33 about the neutral axis of the transmission cable sections 42, 44.

In operation, a transmission cable 16 is spliced, or joined, by first providing two sections of fiber optic cable 42, 44 as best shown in FIG. 3. The sections of cable 42, 44 are straightened using any known method to remove gross bends and waves and weld couplings 46, 48 are slid onto each respective section. A section of splice tube 50 is cut to final length 138, or a predetermined length in excess thereof, and is slid over one of the cable sections 42 or 44. A predetermined length of outer capillary tube 34 and an equal length of polymeric blocking material 38 and pliable material 36 are removed from each cable section 42, 44 using various techniques and sequences as is known to expose coated optical fibers 32, 33. A length 140 of polymeric blocking material 138 is removed from within the outer capillary tube 34 of each of the cable sections 42, 44 using a coring technique, although any known method is possible, to form end portions 88, 90. In a particular embodiment, length 140 is equal to about 2.75 inches. Sealing washers 84, 86 are installed onto inner capillary tube 37 and positioned against end portions 88, 90 of polymeric blocking material 38 in each cable section 42, 44. O-rings 68, 70 are expanded onto inner capillary tube 37 and compressed within outer capillary tube 34 (not shown) and are positioned against the sealing washers 84, 86 in each cable section 42, 44. The inner capillary tube 37 is deburred to the extent possible to protect the fibers 32, 33 from chaffing damage. A device for providing further protection for the optical fibers is disclosed in commonly owned copending U.S. Patent Application, Attorney Docket number CC-0251, filed contemporaneously herewith, entitled "Fiber Optic Sleeve Assembly for use at a Splice Junction of a Fiber Optic Cable", the contents of which is incorporated herein by reference.

In accordance with the present invention, to facilitate joining of two fiber optic transmission cable sections 42, 44, each outer capillary tube 34 is fitted with a heat sink 60, 62, as shown in FIGS. 3 and 6. The heat sink 60 is inserted into the outer capillary tube 34 and over the shoulder portion 134 of end cap 92 with the optical fibers 32, 33 passing through the capillary tube 60, thereby centralizing the optical fibers 32, 33 with respect to the walls of the heat sink tube 60 and the outer capillary tube 34, as shown in FIG. 6. The end caps 92, 94 are preferably brazed to heat sink tubes 60, 62 respectively to facilitate assembly and centering of the heat sink tubes and fibers 32, 33. One or more vent holes 142 may be drilled through outer capillary tube 34 to provide a vent path indicated by arrow 146 for gasses that are heated during the welding process for welds 52, 54 as will be explained more fully herein below. To ensure that the heat sink 60 is fixed with respect to the outer capillary tube 34, the heat sink tube 60 is crimped or swaged to the outer capillary tube 34 at crimps 64, as best seen in FIG. 6. Other methods of attachment are possible. This prevents the heat sink 60 from subsequently sliding within the outer capillary tube 34 and potentially damaging the optical fibers 32, 33 as well as provides a conductive heat path from the outer capillary tube to the heat sink. Compliant elastomeric tube 72 is then inserted within heat sink 60 with optical fibers 32, 33 passing through bore 76, as best seen in FIG. 6, allowing for some portion of length 126 to protrude from the heat sink. Optical fibers 32, 33 and elastomeric tube 72 are then fixed within heat sink 60 and outer capillary tube 34 by crimping or swaging the heat sink at crimp locations 80. The displacement of the heat sink material at the area of the crimps 80 collapses bore 72 of the elastomeric tube onto the optical fibers as described herein above.

Once both of the outer capillary tubes 34 of optical cable sections 42, 44 are fitted with the heat sink 60, 62 and elastomeric tubes 72, 74, the optical fibers are spliced 148, 150 by any known method and the optical cable sections are held in a fixture (not shown) to prevent damage to the fibers while the splice assembly 40 is completed. In certain embodiments, the final length 138 of the splice tube 50 is determined once the optical fiber splice is performed and may vary for each given situation and the splice tube is cut to length 138 and the excess section (not shown) is removed by slicing it in half and slipping it from around the optical cable sections 42, 44. The splice tube 50 is the positioned about equidistant over the splice area 144 and terminating about midspan of the heat sinks 60, 62 as shown in FIG. 3. To facilitate the transition of loads into the splice tube 50 from the fiber optic cable segments 42, 44, weld couplings 46, 48 of the present invention are positioned at about the areas of swaged crimps 64, 66 and welded to optical cable segments 42, 44 with shoulder portion 110 of the weld couplings disposed within the inner diameter 114 of the splice tube as shown in FIGS. 3 and 5. With the splice tube and weld couplings positioned as described and shown in FIG. 3 welds 52, 54 are performed. During the welding process, gases within volume 152, 154 exit through vent hole 147 in outer capillary tubes 34 and follow gas path 146 into the relatively larger volume of splice area 144. Gas path 146 allows the escape of the expanding gases and prevents the over pressurization of volumes 152, 154 which may damage welds 52, 54 during the welding process. Welds 56, 58 are performed to complete splice assembly 40 joining the two cable sections 42, 44 and environmentally sealing the splice area 144.

Figure 10:
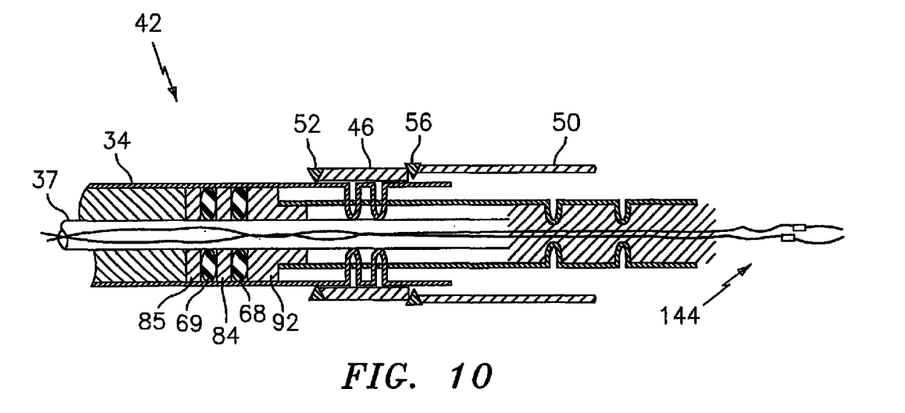
FIG. 10 is a cross sectional schematic representation of an alternative embodiment of a sealing arrangement of a splice protection assembly.

Referring to FIG. 10, there is shown an alternative embodiment of the sealing arrangement of the present invention wherein a second or redundant set of seal washer 85 and o-ring 69 are serially positioned about inner capillary tube 37. In such an embodiment end cap 92 cooperates with o-ring 68 and seal washer 84 as described herein above and further with o-ring 69 and seal washer 85 to further ensure the sealing capability of the present invention to prevent flooding of splice area 144.

Figure 11:
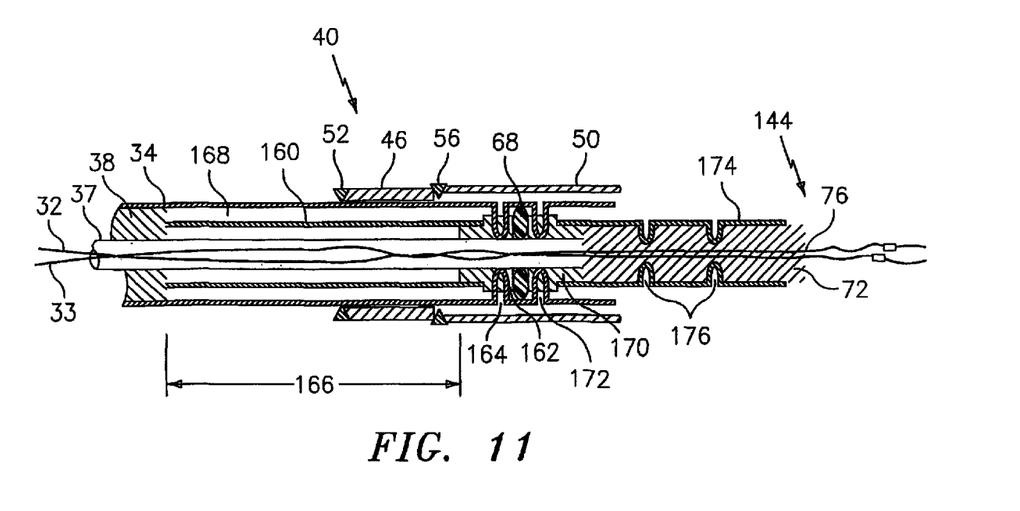
FIG. 11 is a cross sectional schematic representation of an alternative embodiment of a heat sink and sealing arrangement of a splice protection assembly.

Referring to FIG. 11 an alternative embodiment of splice protector 40 is shown wherein heat sink 160 is positioned to direct heat from welds 52, 54 away from splice area 144. Heat sink 160 is attached to end cap 162 and attached to outer capillary tube 34 by, for example, a crimp or swage 164. Heat sink 160 is sized in length represented by arrow 166 to provide a sufficient volume 168 to dissipate the heat from the welds 52, 56 and to maintain the pressure of the expanding gases (not shown) to a relatively low level. O-ring 68 is disposed in an interference fit between inner capillary tube 37 and outer capillary tube 34. O-ring 68 is comprised of a compliant material such as Viton® to effectively seal off the area between blocking material 38 of outer capillary tube 34 and inner capillary tube 37. The o-ring 68 is further positioned between end cap 162 and end cap 170 and is held in lateral compression therebetween as end cap 170 is crimped into outer capillary tube 34 by crimp 172. The fiber strain relief and termination into splice area 144 is accomplished in the embodiment shown by passing the fibers 32, 33 through aperture 76 of elastomeric tube 72 as described herein above. Crimped pair 176 that is attached to end cap 170 by brazing for example captures elastomeric tube 72 within carrier tube 174.

Referring again to FIG. 3A, a fiber optic cable termination 41 is facilitated by stripping off a suitable length of outer capillary tube 34 and buffer material 38 to expose inner capillary tube 37. Inner capillary tube 37 is locked to outer capillary tube 34 by producing roller crimp 43 approximately 0.25 inches from the end of the outer capillary tube. A length of inner capillary tube 37 is terminated at edge 51 and stripped from around fibers 32, 33 as described herein above to expose a suitable length of fibers to produce any contemplated subsequent operation. The edge 51 of inner capillary tube 37 is deburred to the extent possible protect the fibers from chaffing damage. The fiber optic sleeve assembly of the above referenced patent application may be employed to further enhance the protection of the optical fibers. Carrier tube 47 is positioned over inner capillary tube 37 and crimped thereon by a hex crimp 49, for example. Carrier tube 47 may be positioned against cable 44 or a gap 53 may be left between the cable and the carrier tube depending on the embodiment desired. Compliant tube 74 is positioned over fibers 32, 33 and within carrier tube 47 and held therein by crimp 45 similar to that described hereinabove.

While the present invention has been illustrated and described with respect to a particular embodiment thereof, it should be appreciated by those of ordinary skill in the art, that various modifications to this invention may be made without departing from the spirit and scope of the present invention.

We claim:

1. A heat sink for use during assembly, installation and/or repair of a fiber optic transmission cable, said fiber optic transmission cable comprising an outer capillary tube enclosing an inner capillary tube housing at least one optical fiber therein, said heat sink comprising:
   a heat sink tube disposed between said outer capillary tube and said inner capillary tube with said optical fiber passing through said heat sink tube.

2. A heat sink in accordance with claim 1 wherein said heat sink is crimped to said outer capillary tube.

3. A heat sink in accordance with claim 1 wherein said heat sink is comprised of a metallic material.

4. A heat sink in accordance with claim 1 wherein said heat sink is comprised of a copper alloy material.

5. A heat sink in accordance with claim 1 wherein said heat sink is crimped to said inner capillary tube and said outer capillary tube.

6. A fiber strain relief mechanism for use during assembly, installation and/or repair of a fiber optic transmission cable, said fiber optic transmission cable comprising an outer capillary tube enclosing at least one optical fiber having a coating material, said fiber strain relief mechanism comprising a compliant tube disposed within said outer capillary tube with said coated optical fiber retained within said strain relief mechanism.

7. A fiber strain relief mechanism in accordance with claim 6 wherein said fiber strain relief mechanism further comprises a carrier tube retaining said compliant tube within said outer capillary tube.

8. A fiber strain relief mechanism in accordance with claim 7 wherein said compliant tube is crimped within said carrier tube capturing said coated optical fiber within said compliant tube.

9. A fiber strain relief mechanism in accordance with claim 6 wherein said compliant tube is comprised of an elastomeric material.

10. A fiber strain relief mechanism for use during assembly, installation and/or repair of a fiber optic transmission cable, said fiber optic transmission cable comprising an outer capillary tube enclosing an inner capillary tube at least one optical fiber therein having a coating material thereon, said fiber strain relief mechanism comprising a carrier tube disposed on said inner capillary tube and a compliant tube disposed within said carrier tube with said coated optical fiber retained within said strain relief mechanism.

11. A fiber strain relief mechanism in accordance with claim 10 wherein said compliant tube is crimped within said carrier tube capturing said coated optical fiber within said compliant tube.

12. A fiber strain relief mechanism in accordance with claim 10 wherein said compliant tube is comprised of an elastomeric material.

13. An optical fiber protection assembly for use in joining the ends of a pair of fiber optic transmission cables, said fiber optic transmission cables comprising an inner capillary tube enclosing at least one optical fiber having a coating material, said inner capillary tube positioned within an outer capillary tube, said optical fiber protection assembly comprising:
   a carrier tube positioned between said inner capillary tube and said outer capillary tube at said end of each transmission cable;
   a vent hole disposed within each said outer capillary tube proximate the end;
   a strain relief mechanism positioned within each said carrier tube with said coated optical fiber retained within said strain relief mechanism; and
   a splice tube positioned over both ends.

14. An optical fiber protection assembly in accordance with claim 13 further comprising a sealing assembly disposed on said inner capillary tube within said outer capillary tube providing a seal therebetween.

15. An optical fiber protection assembly in accordance with claim 14 wherein said sealing assembly is comprised of a compliant annular member.

16. An optical fiber protection assembly in accordance with claim 15 wherein said sealing assembly comprises:
   a seal washer disposed on said inner capillary tube within said outer capillary tube;
   an end cap disposed on said inner capillary tube within said outer capillary tube; and
   said compliant annular member is disposed between said seal washer and said end cap.

17. An optical fiber protection assembly in accordance with claim 14 further comprising a pair of weld couplings positioned at the ends of said splice tube, said weld couplings welded to said splice tube and to said fiber optic transmission cables.

18. An optical fiber protection assembly in accordance with claim 14 wherein said carrier tube further comprises a heat sink.

19. An optical fiber protection assembly in accordance with claim 14 further comprising a non-rigid splice sleeve disposed on both of said carriers over said optical fiber.

20. An optical fiber protection assembly in accordance with claim 19 wherein said splice sleeve comprises a heat shrinkable material.

21. A method of protecting an optical fiber between the ends of a pair of fiber optic transmission cables, said fiber optic transmission cables comprising an inner capillary tube enclosing at least one optical fiber, said inner capillary tube positioned within an outer capillary tube, said method comprising:

crimping a heat sink tube within said outer capillary tube;

feeding said optical fiber through said heat sink tube and through a fiber strain relief tube;

crimping said fiber strain relief tube within said heat sink tube;

sliding a splice tube over one of said fiber optic transmission cables;

splicing said optic fiber forming an optic fiber splice;

positioning said splice tube over said optic fiber splice; and welding said splice tube to said fiber optic transmission cables.

22. A method of protecting an optical fiber according to claim 21 further comprising installing a sealing mechanism on said inner capillary tube within said outer capillary tube providing a seal therebetween.

23. A method of protecting an optical fiber according to claim 21 further comprising venting gases heated during welding step through a vent hole positioned in said outer capillary tube.

24. A method of protecting an optical fiber at a termination end of a fiber optic transmission cable, said fiber optic transmission cable comprising an inner capillary tube enclosing at least one optical fiber, said inner capillary tube positioned within an outer capillary tube, said method comprising:

disposing a carrier tube onto said inner capillary tube;

feeding said optical fiber through said carrier tube and through a fiber strain relief tube; and crimping said fiber strain relief tube within said carrier tube.

25. A method of protecting an optical fiber between the ends of a pair of fiber optic transmission cables, said fiber optic transmission cables comprising an outer capillary tube enclosing at least one optical fiber, said method comprising:

attaching a heat sink tube to and within said outer capillary tube;

feeding said optical fiber through said heat sink tube and through a fiber strain relief tube;

attaching said fiber strain relief tube within said heat sink tube;

splicing said optic fiber forming an optic fiber splice;

positioning a splice tube over said optic fiber splice; and welding said splice tube to said fiber optic transmission cables.

26. A method of protecting an optical fiber according to claim 25 further comprising venting gases heated during welding step through a vent hole positioned in said outer capillary tube.

27. A method of protecting an optical fiber at a termination end of a fiber optic transmission cable, said fiber optic transmission cable comprising an outer capillary tube enclosing at least one optical fiber, said method comprising:

disposing a carrier tube within said outer capillary tube;

feeding said optical fiber through said carrier tube and through a fiber strain relief tube; and attaching said fiber strain relief tube within said carrier tube.

* * * * *